Figure 1:
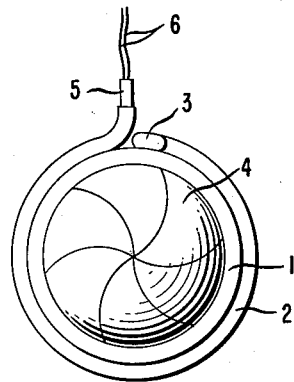

Nov. 6, 1962 C. J. BREZA ET AL 3,062,142
EXPLOSIVE METHOD FOR SEVERING NON-DUCTILE PIPES
Filed Sept. 16, 1958

INVENTORS
CYRIL J. BREZA
HARRY W. HAGUE
ROBERT W. v.d. LUFT
JAMES P. SWED
BY
ATTORNEY

United States Patent Office 3,062,142
Patented Nov. 6, 1962

3,062,142
EXPLOSIVE METHOD FOR SEVERING NON-DUCTILE PIPES
Cyril J. Breza, Thorofare, N.J., Harry W. Hague, Wilmington, Del., and Robert W. v. d. Luft, Woodbury, and James P. Swed, Gibbstown, N.J., assignors to E. I. du Pont de Nemours and Company, Wilmington, Del., a corporation of Delaware
Filed Sept. 16, 1958, Ser. No. 761,355
2 Claims. (Cl. 102—23)

The present invention relates to a method for severing non-ductile pipes. More particularly, the present invention pertains to a novel method for severing non-ductile pipes, such as cast iron, wherein a controlled cracking of the pipe is induced by means of a detonating explosive.

Due to its low cost and durability, cast iron piping is extensively used in construction work, such as water or drainage piping, wherein the incorporation of pipe lengths shorter than that provided by the manufacturer frequently is necessary. In order to obtain usable pipe segments of the desired length, the original section must be cut circumferentially and without longitudinal cracking. Obviously, it is desirable to perform this cutting operation as inexpensively as possible; the total cost and, thereby, the application of the operation being directly proportional to the percentage of pipe unsatisfactorily severed, the amount of man-time required per cut, and the complexity and expense of the equipment employed. Heretofore, the conventional methods for effecting the described operation employed hand tools, i.e., a hammer and chisel, or mechanical devices such as a rotating cutting wheel or an acetylene torch. The first-mentioned means requires the least expensive equipment and is suitable for severing pipes having thin pipe walls and small diameters. Counterbalancing and indeed overriding the assets of this cutting means is the high occurrence of fractured pipe segments obtained thereby; a ten percent frequency not being unusual. The mechanical cutting tools cut the pipes more reliably than the hand tools, but their use is limited by the initial equipment cost and the required accessories for operation, i.e., power or pure oxygen for the cutting wheel and acetylene torch, respectively. In some locations and/or under various weather or field conditions, complying with these requirements is impossible or, at best, unfeasible. In addition to the individual disadvantages, the time and labor per successful cut required by all the aforesaid cutting tools are dependent on the thickness and the diameter of the pipe. In installations where huge volumes of material, e.g., water, sewage, etc., are to be transported, pipes having diameters of two feet or more and pipe-wall thicknesses of over one inch are not uncommon. Cutting such pipes by known procedures necessitates a prohibitive amount of time as well as resulting in an increase in the frequency of unusable pipe segments. The need for a method for severing pipes by a means which will overcome the disadvantages inherent in conventional cutting tools is obvious.

Explosively cutting or perforating ductile metals, i.e., metals that can be permanently deformed without fracturing, is well known in the art. For example, U.S. Patent 1,531,555 issued on March 31, 1925 discloses a method for perforating a metal plate by the detonation of a high explosive having a base area in the shape of the desired perforation. After the detonation, the area previously covered by the explosive is missing, the entire area having been punched out by the explosive force, as is exemplified in the cited reference by the production of metal plates containing centrally positioned holes. It will be readily apparent to those skilled in the art that this method is not applicable to cutting brittle materials, such as cast iron, which fracture essentially without deformation. Cast iron pipes subjected to the disclosed explosive treatment are shattered and contain deep longitudinal cracks in the area adjacent to the perforated section.

Additional art on explosive cutting materials is known, but, to our knowledge, none is directed toward or suitable for cutting non-ductile materials. For example, the most extensively used explosive means for cutting ductile piping employs shaped charges in a procedure which is particularly applicable to cutting pipes which are inaccessible to manual or mechanical tools, such as well tubing. The amount of explosive necessary to form a jet strong enough to produce a continuous circumferential cut in the piping completely fractures cast iron or other non-ductile materials. Additionally, the methods involving the detonation of shaped charges inside tubing require equipment for lowering, positioning, and holding the charge in place prior to the detonation thereof and obviously are impractical in construction work conducted on or near the earth's surface.

Accordingly, an object of the present invention is to provide a method for cutting non-ductile pipes by means of explosives. Another object is to provide a fast, economical means for severing non-ductile pipes wherein pipes of any size can be cut reliably. A specific object of the present invention is to provide an explosive means for circumferentially severing cast iron pipes and obtaining segments thereof which are free of longitudinal cracks. Additional objects of the present invention will become apparent as the invention is described in greater detail.

We have found that the foregoing objects are attained when we explosively induce controlled weakening of the pipe in the desired area followed by manual separation of the segments. To accomplish the controlled weakening, we encircle the pipe to be severed with a narrow strip of a detonating explosive, the quantity of explosive per unit of length in said strip being insufficient to perforate said pipe but being sufficient to induce cracking, provide in contact with the inner wall of the pipe opposite said explosive strip a medium having a density of at least 1 gram per cubic centimeter, and thereafter initiate said strip of explosive. The detonation of the strip of explosive will produce an annular crack at a location corresponding approximately to the center line of the explosive strip, and the pipe will be severed at this crack. In order to eliminate undesired longitudinal cracking caused by a converging shock wave 180° from the point of initiation, we prefer to initiate the strip at one end and have the encirclement of the pipe limited so that the remaining end of the strip will not be initiated simultaneously with the first end but only as the result of the detonation of the entire strip. To reduce the space required between the ends of the strip, we may use an inert barrier between the ends, for example, clay.

Figure 2:
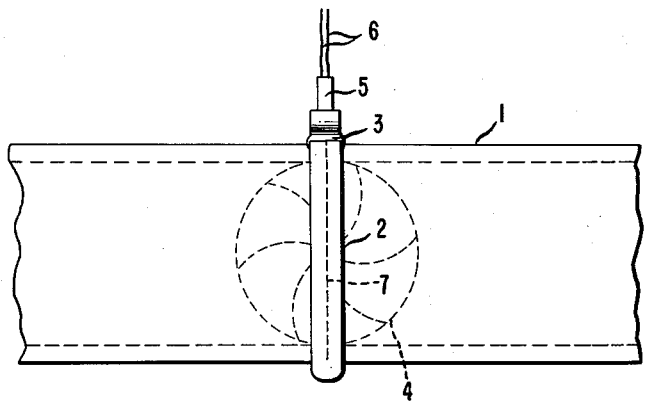

In order to describe my invention more fully, reference now is made to the accompanying drawings which are illustrative only, the invention not being limited thereto. The same numbers refer to equivalent parts. FIGURES 1 and 2 represent an end and longitudinal view, respectively, of the pipe to be severed and the explosive assembly for producing the circumferential crack. Referring in greater detail to the drawings and particularly to FIGURE 1, 1 represents the cast iron pipe wall to be cut encircled by a strip of a high-velocity detonating explosive 2, the ends of which are separated by an explosively inert material 3, e.g., clay. 4 represents a medium having a density of at least 1 gram per cubic centimeter in contact with the inner surface of the pipe opposite the surface covered by the explosive strip 2. An electric initiator 5 containing lead wires 6 is fastened to one end of the explosive strip 2. In FIGURE 2, 7 represents the line upon which the cracking will occur. The remaining dotted lines in FIGURE 2 represent interior portions of the pipe.

In carrying out the method of the invention, the actuation of the initiator 5 initiates the high-velocity detonating explosive strip 2. The presence of the explosively inert material 3 restricts the propagation of the detonation shock to one direction, i.e., around the explosive wrap. After the pipe is cracked around the circumference 7, the tension waves produced by the rarefaction of the shock waves are carried off by the medium 4, thus preventing longitudinal cracking and spalling in the pipe.

In order to illustrate the invention further, reference now is made to the following examples. In the examples, the explosive wrap consisted of sheet explosive prepared by mixing 85 parts of PETN, 7.5 parts of butyl rubber, and 7.5 parts of a thermoplastic terpene resin (mixture of β-pinene polymers having the formula $(C_{10}H_{16})_n$ and commercially available as "Piccolyte" S-10 manufactured by the Pennsylvania Industrial Chemical Corporation). The final blend was rolled into sheets, the thickness of which determined the weight of explosive per unit area. The composition has a velocity of detonation of approximately 7000 meters per second, and the sheets are strong, flexible, and non-resilient.

EXAMPLE 1

A 0.25-inch wide strip of the described explosive sheet containing 0.75 gram of explosive per linear inch was glued by means of a rubber cement around a cast iron pipe having a 6-inch outside diameter and a 0.375-inch wall thickness, the encirclement being restricted so as to leave a distance of 0.125 inch between the ends of the strip. This void area was covered by clay. The interior of the pipe was filled with water-wet earth having a density of 1.8 grams per cubic centimeter. A commercial detonator (Engineers' blasting cap) was fastened to one end of the explosive strip and initiated.

The resulting cast iron pipe had a circumferential crack penetrating almost completely through the pipe wall except for the 0.125 inch covered by the clay which remained intact. The segments were easily separated by a single, sharp hammer blow. The ends of the segments thus obtained were smooth, did not possess longitudinal cracks, and were not constricted, thus producing a strong, usable pipe section of the desired length.

EXAMPLE 2

A number of cast iron pipes were successfully severed according to the general procedure outlined in Example 1. In all cases, the strip of explosive was 0.31 inch wide. The data on the modifications of pipe dimensions, explosive loading, and medium employed are reported in the following table. In a few cases, the cracking penetrated deep enough so that the segments could be pulled apart. Generally, however, the separation was effected by means of a hammer blow. The ends of the resulting segments possessed the desired characteristics of smoothness and lack of longitudinal cracking.

Table

| Pipe Size (in.) | | Explosive Load (gms./linear in.) | Medium (inside pipe) |
|---|---|---|---|
| diam. | wall thickness | | |
| 8 | 0.375 | 0.75 | water. |
| 8 | 0.375 | 0.75 | sand. |
| 8 | 0.375 | 0.75 | water in polyethylene bag. |
| 8 | 0.375 | 0.75 | water. |
| 4 | 0.375 | 0.87 | water-wet earth. |
| 6 | 0.500 | 0.87 | water-filled basketball. |
| 8 | 0.500 | 0.87 | Do. |
| 18 | 0.562 | 1.2 | Do. |
| 16 | 0.625 | 1.2 | water. |
| 12 | 0.500 | 1.2 | Do. |
| 12 | 0.687 | 1.5 | Do. |
| 12 | 0.687 | 2.0 | water-filled beachball. |
| 16 | 0.625 | 2.5 | water. |

As is evident from the preceding table, many variations are possible without departure from the scope of the invention. Although only one blend of PETN has been exemplified as the means for inducing cracking, the use of any high-velocity detonating explosive is contemplated. By the term "high-velocity detonating explosive," we mean a composition having, when unconfined, a velocity of detonation of more than 1200 meters per second. The particular explosive employed is not critical to the invention. For example, tetryl and pentolite (50% PETN and 50% TNT) provide suitable energy to accomplish the objects of the present invention.

For ease of application and control of loading density, the explosive composition preferably is in the form of a sheet as has been exemplified. However, any form of a suitable explosive, as characterized in the foregoing, is applicable, subject to the requirements that a uniform quantity of explosive per unit of area be used and that the explosive be in substantially direct contact with the pipe. For example, the use of a blasting gelatin is feasible, and even the use of an explosive powder contained in a suitable container is possible, if desired.

The loading density of the explosive, i.e., the amount of explosive per linear unit, is dependent on the wall thickness of the pipe to be severed. As previously stated, sufficient explosive to crack the pipe without perforating it is used. As can be seen in the examples, this amount is very small, ranging from 0.75 to 2.5 grams of explosive per linear inch for pipes of from 0.375- to 0.625-inch wall thicknesses, respectively. We have found that underloading is preferable to overloading. In the former situation, a shallow circumferential crack is formed which may be deepened, if necessary, by repeating the procedure of the invention. However, as long as the crack penetrates approximately halfway through the pipe or more, sufficient weakening of the pipe has been attained and the crack pattern of the pipe established so that final separation by conventional means, such as by a hammer blow, presents no difficulty. On the other hand, if too much explosive is used, shattering and longitudinal cracking occur in the pipe, producing unusable pipe segments.

It will be understood that the width of the strip of explosive encircling the pipe must be sufficient to guarantee propagation of the detonation throughout the layer. However, in order to concentrate the blasting force on a thin section of the pipe wall, thus leading to cracking, the strip should be relatively narrow. In order to satisfy both of the foregoing conditions in strips of explosive of the type used in the examples, we have employed strips having a width of between 0.2 and 0.5 inch.

The means for initiating the explosive is not critical to the present invention, and the selection thereof depends on the sensitivity of the selected explosive.

One of the critical features of the present invention resides in the positioning of a material having a density of at least 1 gram per cubic centimeter in the interior area of the pipe corresponding to the circumference externally encircled by the explosive strip. This medium will carry off the tension waves produced by the rarefaction of the shock waves and prevent spalling and longitudinal cracking of the pipe. In order to preclude such spalling and longitudinal cracking, no air space may be tolerated between the transmitting medium and the inner pipe well. Obviously, an excess quantity of the medium will not produce deleterious effects. From a practical point of view, the use of mud, sand, or water as the medium is advantageous due to the accessibility of the same in locations wherein this operation frequently is conducted. However, the use of a liquid-filled expansible container, such as a rubber balloon or basketball, has many unique attributes in this work which merit contemplation: the deflated container can be inserted easily into position and then filled with the medium, e.g., water; a heavy-walled flexible container is not damaged by the explosion and can be reused; and the pipe is kept clean throughout the operation. The lack of damage to the heavy-walled container is evidence that the pipe is cracked, not perforated, by the detonation of the explosive.

Another of the critical features of the present invention is the prevention of the convergence of the shock waves at a point 180° from the point of initiation, which convergence would produce higher pressures, causing undesirable side-cracking in the pipe. Accordingly, the encirclement of the pipe by the explosive strip is interrupted at any point on the circumference for a space sufficient to preclude the convergence of the detonation fronts or at such a point so as to restrict the propagation of the detonation to one direction. We prefer the latter method and preclude bidirectional propagation of the detonation by initiating the explosive strip at one end and having the encirclement of the pipe limited so that the remaining end will not be initiated simultaneously with the first end. In order to reduce the amount of space required to separate the ends of the explosive strip satisfactorily for the aforenamed purpose, we prefer to incorporate an explosively inert material as a barrier between the ends of the explosive strip. We have found that a length of clay of only 0.125 inch is satisfactory.

Also a critical feature of the present invention is the necessity of having the explosive in close contact with the pipe. We have accomplished this by gluing the explosive onto the pipe by means of a rubber cement. In this way, the blasting force impinges on and is concentrated upon a relatively narrow pipe-wall section and is fully effective in cracking the pipe wall. The presence of any air gaps between the explosive and the pipe causes scattering of the detonation waves and results in forces of various magnitudes acting on the pipe wall causing longitudinal cracking. Any means for excluding air gaps between the explosive and the pipe, such as maintaining contact of the two by clips, tapes, bands, etc., is contemplated and within the scope of the invention.

As is obvious to one skilled in the art, the present invention is applicable to cutting non-ductile pipes of any diameter, wall thickness, and/or composition. Also obvious is the extension of the present invention to include cutting pipes other than cylindrical, e.g., rectangular, etc.

Whereas the present invention and the modifications thereof have been fully discussed in the foregoing, we wish to be limited only by the following claims.

We claim:

1. A method of severing a cast-iron pipe wherein a controlled circumferential partial crack in said pipe is induced explosively, which comprises placing around the periphery of said pipe, in substantially direct contact therewith, a strip of a high velocity detonating explosive, said strip having from 0.75 to 2.5 grams of said explosive per linear inch and having a loading density which is uniform and sufficient to induce a partial crack in said pipe but insufficient to induce, by itself, a severing of said pipe, and said strip being placed around said pipe in a manner such that said pipe is substantially encircled by said strip, the encirclement of said pipe being interrupted at a point on the periphery of said pipe for a space sufficient to preclude the convergence of detonation waves upon initiation of said strip, at least one end of said cord at said space being provided with a detonation wave barrier, filling the inner area of said pipe opposite said strip with a material having a density of at least about 1 gram per cubic centimeter, initiating said strip whereby an annular partial crack is produced in said pipe and separating said pipe, at the said crack, into segments.

2. A method of severing a non-ductile pipe according to claim 1 wherein an explosively inert material at least 0.125 inch long is positioned between the ends of said strip and said strip is initiated at one end.

References Cited in the file of this patent

UNITED STATES PATENTS

| | | |
|---|---|---|
| 1,531,555 | Harris et al. | Mar. 31, 1925 |
| 2,367,206 | Davis | Jan. 16, 1945 |
| 2,543,057 | Porter | Feb. 27, 1951 |
| 2,703,297 | MacLeod | Mar. 1, 1955 |
| 2,708,408 | Sweetman | May 17, 1955 |
| 2,737,115 | Bissel | Mar. 6, 1956 |